US012566594B2

(12) United States Patent
Gao et al.

(10) Patent No.: US 12,566,594 B2
(45) Date of Patent: Mar. 3, 2026

(54) DISCOVERY OF HIGH VALUE MACHINE LEARNING PIPELINE SEGMENT AND REUSE

(71) Applicant: International Business Machines Corporation, Armonk, NY (US)

(72) Inventors: Lei Gao, Xi'an (CN); Jin Wang, Xi'an (CN); A Peng Zhang, Xi'an (CN); Kai Li, Xi'an (CN); Yan Liu, Xi'an (CN); Geng Wu Yang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 18/476,435

(22) Filed: Sep. 28, 2023

(65) Prior Publication Data

US 2025/0110707 A1      Apr. 3, 2025

(51) Int. Cl.
*G06F 8/35*          (2018.01)
*G06F 8/36*          (2018.01)
*G06F 8/41*          (2018.01)

(52) U.S. Cl.
CPC .................. *G06F 8/35* (2013.01); *G06F 8/36* (2013.01); *G06F 8/433* (2013.01)

(58) Field of Classification Search
CPC .............................. G06F 8/35–36; G06F 8/433
USPC .............................. 717/120–140; 706/21–45
See application file for complete search history.

(56) References Cited

U.S. PATENT DOCUMENTS

| | | | | |
|---|---|---|---|---|
| 11,392,358 | B1 * | 7/2022 | Saha ........................ | G06F 8/433 |
| 11,409,505 | B1 * | 8/2022 | Chartrand ................. | G06F 8/36 |
| 11,693,634 | B2 * | 7/2023 | Oburu .................... | G06Q 40/03 717/105 |
| 11,720,350 | B1 * | 8/2023 | Bogushefsky, III ...... | G06F 8/76 717/108 |
| 11,755,345 | B2 * | 9/2023 | Li .......................... | G06N 3/045 717/125 |
| 11,776,060 | B2 * | 10/2023 | Briancon ......... | G06Q 10/06393 706/20 |
| 11,900,325 | B2 * | 2/2024 | Kulkarni .............. | G06Q 10/103 |
| 12,271,720 | B1 * | 4/2025 | Silver .................... | G06N 5/025 |
| 12,430,437 | B2 * | 9/2025 | Hewlett, II .......... | G06F 21/566 |
| 2020/0401950 | A1 | 12/2020 | Han et al. | |
| 2023/0101955 | A1 | 3/2023 | Vo et al. | |

(Continued)

OTHER PUBLICATIONS

Bother et al, "Modyn: Data-Centric Machine Learning Pipeline Orchestration", ACM, pp. 1-30 (Year: 2025).*

(Continued)

*Primary Examiner* — Anil Khatri

(74) *Attorney, Agent, or Firm* — CANTOR COLBURN LLP; Jordan Schiller

(57)                    ABSTRACT

Computer-implemented methods for discovery and reuse of a high value pipeline segment are provided. Aspects include defining a set of datasets associated with a processing pipeline based on a set of data operations of the processing pipeline. Aspects also include generating a library of pipeline segments based on the processing pipeline and at least one dataset of the set of datasets. In some aspects, generating the library of pipeline segments includes adding a pipeline segment of the processing pipeline to the library based on one or more characteristics of a dataset generated by the pipeline segment, where the dataset is included in the set of datasets.

17 Claims, 11 Drawing Sheets

(56) References Cited

U.S. PATENT DOCUMENTS

| | | |
|---|---|---|
| 2023/0126005 A1 | 4/2023 | Dirac et al. |
| 2023/0162289 A1* | 5/2023 | Briancon ............ G06F 18/2148 |
| | | 706/12 |

OTHER PUBLICATIONS

Weide et al, "Versioning for End-to-End Machine Learning Pipelines", ACM, pp. 1-9 (Year: 2017).*

Vartak et al, "ModelDB: A System for Machine Learning Model Management", ACM, pp. 1-3 (Year: 2016).*

Wu et al, "Data Pipeline Training: Integrating AutoML to Optimize the Data Flow of Machine Learning Models", IEEE, pp. 1-5 (Year: 2024).*

AlShehhi et al, "Machine Learning Pipeline for Reusing Pretrained Models", ACM, pp. 1-4 (Year: 2020).*

* cited by examiner

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DISCOVERY AND REUSE OF HIGH-VALUE MACHINE LEARNING PIPELINE SEGMENTS          150

PERIPHERAL DEVICE SET 114

UI DEVICE SET 123          STORAGE 124          IoT SENSOR SET 135

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131          HOST PHYSICAL MACHINE SET 142

VIRTUAL MACHINE SET 143          CONTAINER SET 144

100

*FIG. 1*

Figure 6:
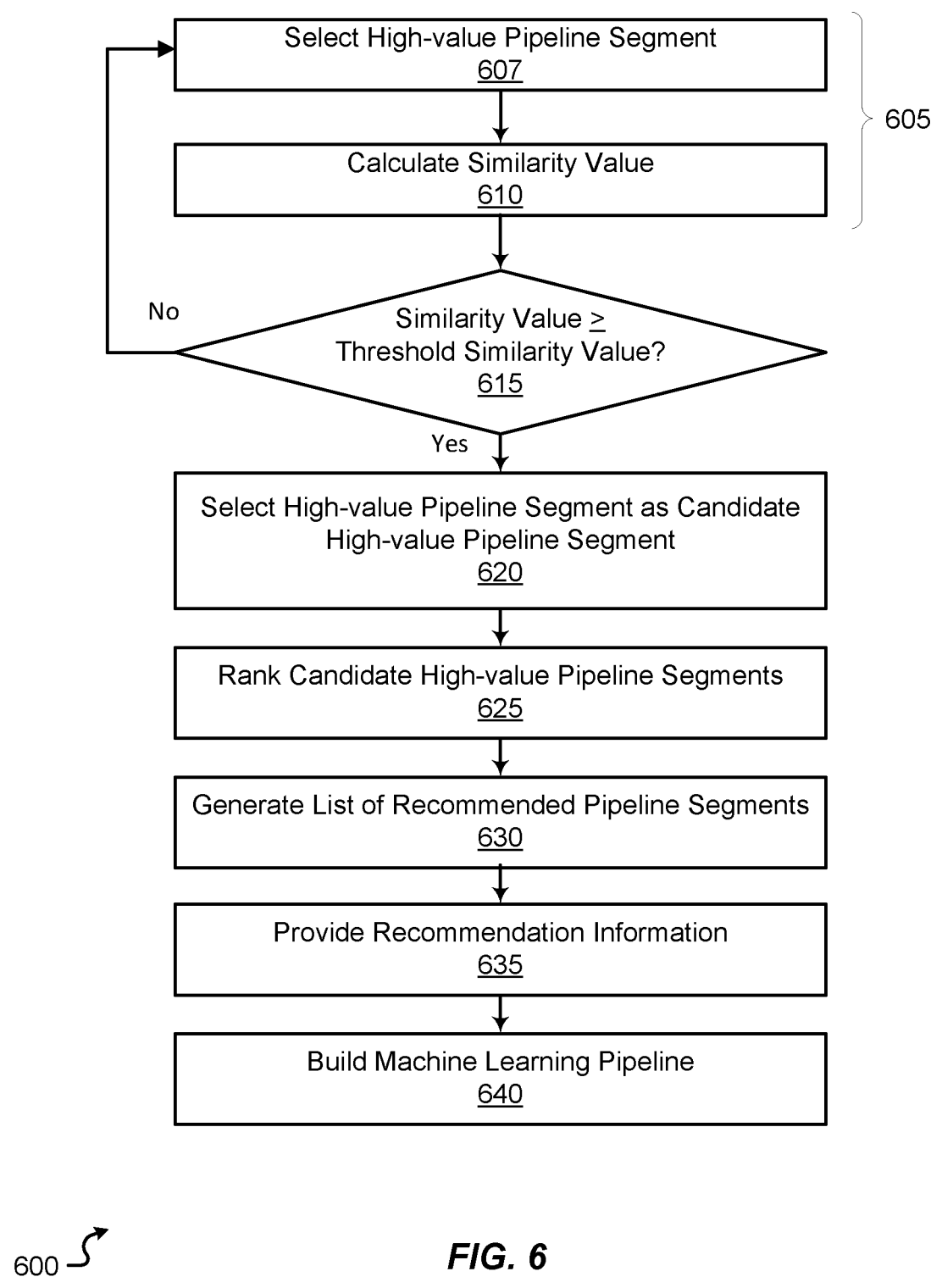

Select High-value Pipeline Segment
607

Calculate Similarity Value
610

605

Similarity Value ≥
Threshold Similarity Value?
615

No

Yes

Select High-value Pipeline Segment as Candidate
High-value Pipeline Segment
620

Rank Candidate High-value Pipeline Segments
625

Generate List of Recommended Pipeline Segments
630

Provide Recommendation Information
635

Build Machine Learning Pipeline
640

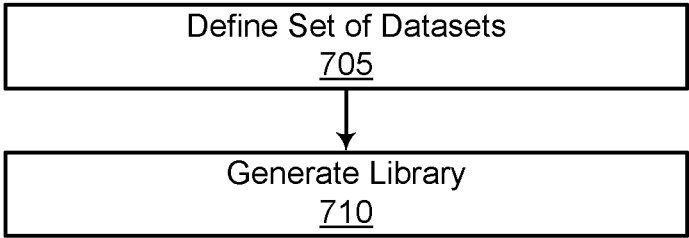
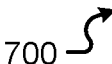
FIG. 7

Define Set of Datasets
805

Generate Library
810

Store First Metadata and Second Metadata
811

Store Position Information and/or Model Building Operation
812

Calculate Data Quality
815

Calculate Evolution Degree
820

800

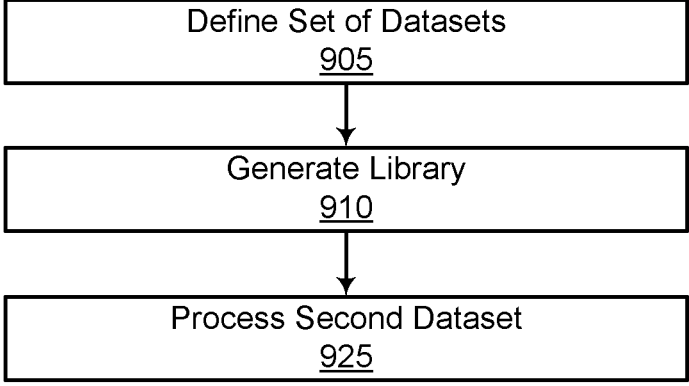
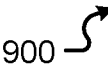
*FIG. 9*

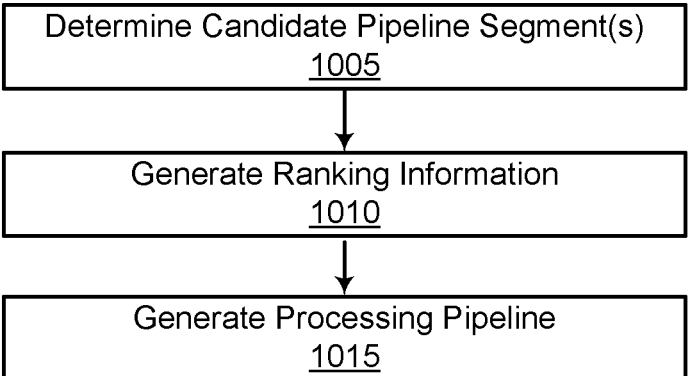
Determine Candidate Pipeline Segment(s)
1005
Generate Ranking Information
1010
Generate Processing Pipeline
1015
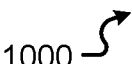
1000
*FIG. 10*

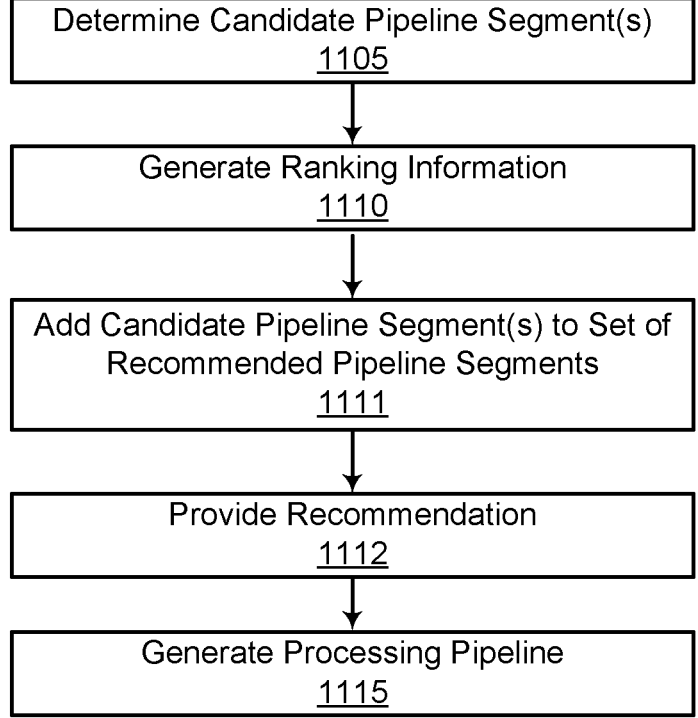
Determine Candidate Pipeline Segment(s)
1105
Generate Ranking Information
1110
Add Candidate Pipeline Segment(s) to Set of
Recommended Pipeline Segments
1111
Provide Recommendation
1112
Generate Processing Pipeline
1115
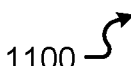
1100
*FIG. 11*

DISCOVERY OF HIGH VALUE MACHINE LEARNING PIPELINE SEGMENT AND REUSE

BACKGROUND

The present disclosure generally relates to machine learning pipelines, and more specifically, to techniques for discovering and reusing high-value machine learning pipeline segments.

In areas related to artificial intelligence and the processing of big data, a data scientist may design a machine learning pipeline in association with solving one or more problems. However, creating a machine learning pipeline is a time-consuming and iterative process, and successful creation of an effective machine learning pipeline can be dependent on the experience of the data scientist. Techniques for efficient creation and configuration of a machine learning pipeline are desired.

SUMMARY

Embodiments of the present disclosure are directed to computer implemented methods for discovering and reusing high value machine learning pipeline segments. According to an aspect, a computer implemented method includes defining a set of datasets associated with a processing pipeline based on a set of data operations of the processing pipeline. The method also includes generating a library of pipeline segments based on the processing pipeline and at least one dataset of the set of datasets, where generating the library of pipeline segments includes adding a pipeline segment of the processing pipeline to the library based on one or more characteristics of a dataset generated by the pipeline segment, where the dataset is included in the set of datasets.

Embodiments also include a computing system having a memory having computer readable instructions and one or more processors for executing the computer readable instructions. The computer readable instructions control the one or more processors to perform operations that include defining a set of datasets associated with a processing pipeline based on a set of data operations of the processing pipeline. The operations also include generating a library of pipeline segments based on the processing pipeline and at least one dataset of the set of datasets, where generating the library of pipeline segments includes adding a pipeline segment of the processing pipeline to the library based on one or more characteristics of a dataset generated by the pipeline segment, where the dataset is included in the set of datasets.

Embodiments also include a computer program product having a computer readable storage medium having program instructions embodied therewith. The program instructions executable by a processor to cause the processor to perform operations that include defining a set of datasets associated with a processing pipeline based on a set of data operations of the processing pipeline. The operations also include generating a library of pipeline segments based on the processing pipeline and at least one dataset of the set of datasets, where generating the library of pipeline segments includes adding a pipeline segment of the processing pipeline to the library based on one or more characteristics of a dataset generated by the pipeline segment, where the dataset is included in the set of datasets.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 1 depicts a block diagram of an example computer system for use in conjunction with one or more embodiments of the present disclosure.

FIG. 6 illustrates an example flowchart that supports high-value pipeline segment recommendation in association with generating a machine learning pipeline in accordance with one or more embodiments of the present disclosure.

FIGS. 7, 8, and 9 illustrate example flowcharts that support discovery of a high value pipeline segment in accordance with one or more embodiments of the present disclosure.

FIGS. 10 and 11 illustrate example flowcharts that support high-value pipeline segment recommendation in association with generating a machine learning pipeline in accordance with one or more embodiments of the present disclosure.

DETAILED DESCRIPTION

Figure 2:
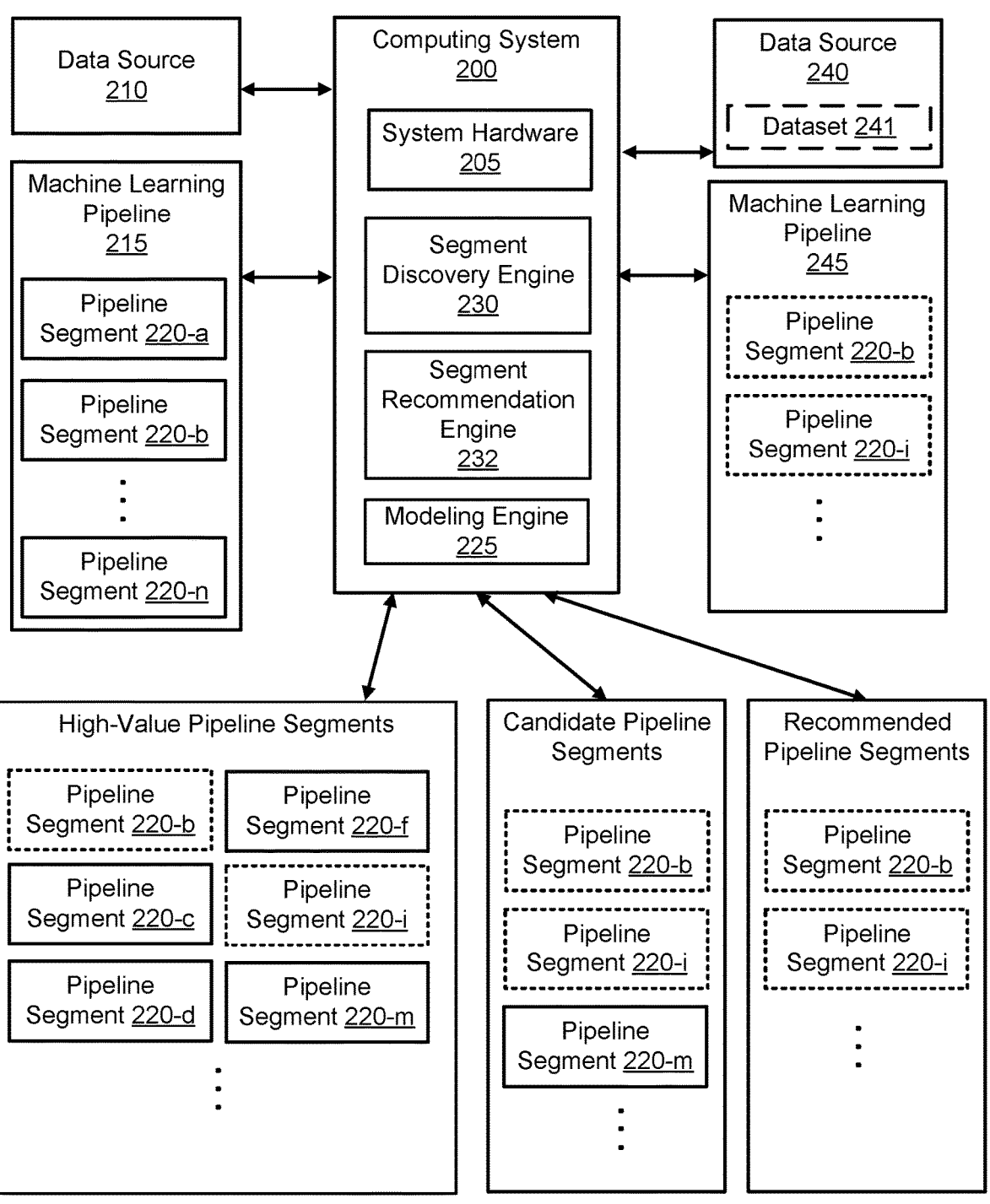
FIG. 2 depicts a block diagram of an example computing system that supports discovery and reuse of high-value machine learning pipeline segments in accordance with one or more embodiments of the present disclosure.

Embodiments of the present disclosure are directed to computer implemented methods for discovering and reusing high value machine learning pipeline segments. According to an aspect, a computer implemented method includes defining a set of datasets associated with a processing pipeline based on a set of data operations of the processing pipeline. The method also includes generating a library of pipeline segments based on the processing pipeline and at least one dataset of the set of datasets, where generating the library of pipeline segments includes adding a pipeline segment of the processing pipeline to the library based on one or more characteristics of a dataset generated by the pipeline segment, where the dataset is included in the set of datasets. The computer-implemented method provides advantages and technical improvements that support a process capable of discovering high value pipeline segments for reuse from a processing pipeline (e.g., a machine learning pipeline, a model building pipeline), which is lacking in other pipeline analysis techniques.

Embodiments also include a computing system having a memory having computer readable instructions and one or more processors for executing the computer readable instructions. The computer readable instructions control the one or more processors to perform operations that include defining a set of datasets associated with a processing pipeline based on a set of data operations of the processing pipeline. The operations also include generating a library of pipeline segments based on the processing pipeline and at least one dataset of the set of datasets, where generating the library of pipeline segments includes adding a pipeline segment of the processing pipeline to the library based on one or more characteristics of a dataset generated by the pipeline segment, where the dataset is included in the set of datasets. The operations provide advantages and technical improvements that support discovering high value pipeline segments for reuse from a processing pipeline (e.g., a machine learning pipeline, a model building pipeline), which is lacking in other pipeline analysis techniques.

Embodiments also include a computer program product having a computer readable storage medium having program instructions embodied therewith. The program instructions executable by a processor to cause the processor to perform operations that include defining a set of datasets associated with a processing pipeline based on a set of data operations of the processing pipeline. The operations also include generating a library of pipeline segments based on the processing pipeline and at least one dataset of the set of datasets, where generating the library of pipeline segments includes adding a pipeline segment of the processing pipeline to the library based on one or more characteristics of a dataset generated by the pipeline segment, where the dataset is included in the set of datasets. The operations provide advantages and technical improvements that support discovering high value pipeline segments for reuse from a processing pipeline (e.g., a machine learning pipeline, a model building pipeline), which is lacking in other pipeline analysis techniques.

In addition to one or more of the features described herein, the methods and operations include calculating a data quality of the dataset based on a quality index associated with one or more columns of data included in the dataset, where adding the pipeline segment to the library is based on comparing the data quality to a threshold data quality value. Advantageously, leveraging the quality index enables improved discovery of high value pipeline segments for reuse from a processing pipeline compared to some other pipeline analysis techniques, as other pipeline analysis techniques merely focus on machine learning model reuse based on similarities between machine learning models.

In addition to one or more of the features described herein, the methods and operations include calculating an evolution degree associated with the dataset based on a comparison of the dataset and an input dataset associated with the pipeline segment, where adding the pipeline segment to the library is based on comparing the evolution degree to a threshold evolution degree value. Advantageously, leveraging the evolution degree enables improved discovery of high value pipeline segments for reuse from a processing pipeline compared to some other pipeline analysis techniques, as other pipeline analysis techniques merely focus on machine learning model reuse based on similarities between machine learning models. For example, comparison of the dataset generated by the pipeline segment and the input dataset associated with the pipeline segment advantageously supports an accurate assessment of the data transformation performed by the pipeline segment.

In addition to one or more of the features described herein, the methods and operations include calculating an evolution degree associated with the dataset based on an update rate, where the update rate is associated with data included in the dataset and second data included in an input dataset associated with the pipeline segment, and where the one or more characteristics of the dataset include the evolution degree. Advantageously, leveraging the update rate enables improved discovery of high value pipeline segments for reuse from a processing pipeline compared to some other pipeline analysis techniques. For example, the update rate advantageously supports an accurate assessment of the data transformation performed by the pipeline segment.

In addition to one or more of the features described herein, the methods and operations include refraining from evaluating the dataset based on determining the dataset is an input dataset associated with at least a first data operation and a second data operation of the processing pipeline. In one or more embodiments, the methods and operations include refraining from evaluating the dataset based on determining the dataset is an output dataset associated with at least a third data operation and a fourth data operation of the processing pipeline.

Advantageously, refraining from evaluating the dataset based on such criteria associated with a dataset enables improved processing efficiency and reduced processing overhead with respect to the discovery of high value pipeline segments for reuse from a processing pipeline. For example, refraining from evaluating the dataset based on such criteria associated with a dataset enables improved processing efficiency and reduced processing overhead by pausing the discovery process for cases in which a data operation associated with an evaluated dataset is a branch node having multiple inputs or multiple outputs.

In addition to one or more of the features described herein, the methods and operations include storing, to the library of pipeline segments first metadata associated with the dataset generated by the pipeline segment. In one or more embodiments, the methods and operations include storing, to the library of pipeline segments, second metadata associated with an input dataset associated with the pipeline segment. Advantageously, leveraging the metadata enables efficient identification of a high-value pipeline segment to be included in a library of high-value pipeline segments. Advantageously, leveraging the metadata enables improved efficiency associated with determining whether to add a pipeline segment to a library of high-value pipeline segments.

In addition to one or more of the features described herein, the methods and operations include storing, to the library of pipeline segments, position information of the pipeline segment with respect to the processing pipeline. Advantageously, leveraging the position information enables improved understanding of a pipeline segment (e.g., by a user, by a computing system) in association with determining whether to reuse the pipeline segment. In one or more embodiments, the methods and operations include storing, to the library of pipeline segments, a model building operation associated with at least a portion of the pipeline segment. Advantageously, leveraging information indicative of the model building operation enables improved understanding of a pipeline segment (e.g., by a user) in association with determining whether to reuse the pipeline segment.

In addition to one or more of the features described herein, the processing pipeline includes one of a machine learning pipeline and a model building pipeline. The computer-implemented method advantageously provides techniques for discovering high value pipeline segments for reuse, applicable to machine learning and model building.

In addition to one or more of the features described herein, the methods and operations include processing, by the processing pipeline, a second dataset different from the set of datasets, where processing the second dataset includes caching output data associated with the pipeline segment. Advantageously, when processing new data using a processing pipeline for which high-value pipeline segments have already been identified, caching output data (e.g., intermediate data) associated with the high-value pipeline segments provides a technical improvement through a type of improved fault-tolerant mechanism for cases in which a problem arises during the execution of the existing pipeline flow.

According to an aspect, a computer implemented method includes determining at least one candidate pipeline segment from among a set of pipeline segments in association with generating a processing pipeline, where determining the at least one candidate pipeline segment is based on a similarity value between a dataset to be processed by the processing pipeline and an input dataset associated with the at least one candidate pipeline segment. The method also includes generating ranking information associated with the at least one candidate pipeline segment based on the similarity value. The method also includes generating the processing pipeline using the at least one candidate pipeline segment or at least one other candidate pipeline segment, based on the ranking information of the at least one candidate pipeline segment. The computer-implemented method provides advantages and technical improvements that support the automatic detection of the similarity between a dataset for a new pipeline flow and the input datasets of high-value pipeline segments, the automatic recommendation of high-value pipeline segments for the new pipeline flow based on the similarities, and the automatic and/or semi-automatic (e.g., in combination with a user input) reuse of high-value pipeline segments based on respective rankings.

Embodiments also include a computing system having a memory having computer readable instructions and one or more processors for executing the computer readable instructions. The computer readable instructions control the one or more processors to perform operations that include determining at least one candidate pipeline segment from among a set of pipeline segments in association with generating a processing pipeline, where determining the at least one candidate pipeline segment is based on a similarity value between a dataset to be processed by the processing pipeline and an input dataset associated with the at least one candidate pipeline segment. The operations also include generating ranking information associated with the at least one candidate pipeline segment based on the similarity value. The operations also include generating the processing pipeline using the at least one candidate pipeline segment or at least one other candidate pipeline segment, based on the ranking information of the at least one candidate pipeline segment. The operations provides advantages and technical improvements that support the automatic detection of the similarity between a dataset for a new pipeline flow and the input datasets of high-value pipeline segments, the automatic recommendation of high-value pipeline segments for the new pipeline flow based on the similarities, and the automatic and/or semi-automatic (e.g., in combination with a user input) reuse of high-value pipeline segments based on respective rankings.

Embodiments also include a computer program product having a computer readable storage medium having program instructions embodied therewith. The program instructions executable by a processor to cause the processor to perform operations that include determining at least one candidate pipeline segment from among a set of pipeline segments in association with generating a processing pipeline, where determining the at least one candidate pipeline segment is based on a similarity value between a dataset to be processed by the processing pipeline and an input dataset associated with the at least one candidate pipeline segment. The operations also include generating ranking information associated with the at least one candidate pipeline segment based on the similarity value. The operations also include generating the processing pipeline using the at least one candidate pipeline segment or at least one other candidate pipeline segment, based on the ranking information of the at least one candidate pipeline segment. The operations provides advantages and technical improvements that support the automatic detection of the similarity between a dataset for a new pipeline flow and the input datasets of high-value pipeline segments, the automatic recommendation of high-value pipeline segments for the new pipeline flow based on the similarities, and the automatic and/or semi-automatic (e.g., in combination with a user input) reuse of high-value pipeline segments based on respective rankings.

In addition to one or more of the features described herein, the methods and operations include calculating the similarity value based on an evolution degree associated with the dataset and the input dataset. Advantageously, leveraging the evolution degree enables improved comparison of a dataset for a new pipeline flow and an input dataset of a high-value pipeline segment in association with identifying whether to reuse the high-value pipeline segment. For example, leveraging the evolution degree advantageously supports an accurate assessment of the similarity (of lack of similarity) between the dataset for the new pipeline flow and the input dataset of the high-value pipeline segment.

In addition to one or more of the features described herein, the methods and operations include providing a recommendation associated with using the at least one candidate pipeline segment for generating the processing pipeline. In one or more embodiments, the recommendation includes metadata of an output dataset associated with the at least one candidate pipeline segment. Advantageously, leveraging the metadata enables efficient identification and understanding of a recommended high-value pipeline segment, for example, in determining whether to reuse the high-value pipeline segment for a new pipeline flow. In one or more embodiments, the recommendation includes a model building operation associated with at least a portion of the at least one candidate pipeline segment. Advantageously, leveraging information indicative of the model building operation enables efficient understanding of a recommended high-value pipeline segment, for example, in determining whether to reuse the high-value pipeline segment for a new pipeline flow.

In addition to one or more of the features described herein, the methods and operations include adding the at least one candidate pipeline segment to a set of recommended pipeline segments based on the ranking information associated with the at least one candidate pipeline segment, where the set of recommended pipeline segments further includes the at least one other candidate pipeline segment. Advantageously, leveraging the ranking information when recommending a candidate pipeline segment (e.g., a high-value pipeline segment) to a user enables improved user efficiency with respect to determining whether to add the candidate pipeline segment to a new pipeline flow.

In areas related to artificial intelligence and the processing of big data, a data scientist may design a machine learning pipeline in association with solving one or more problems (e.g., a business problem and the like). For example, the data scientist may use a machine learning pipeline to perform the analysis process from data to model, and the model may be applied for prediction or forecasting.

In some cases, a machine learning pipeline may include one or multiple data sources, multiple data transformation nodes, and terminal nodes. In some cases, the terminal nodes may support model building and data integration (e.g., extract, transform, and load (ETL) for moving data from a source or multiple sources into another database).

However, creating a machine learning pipeline is a time-consuming and iterative process, and successful creation of an effective machine learning pipeline can be dependent on the experience of the data scientist. In an example, to create a model capable of meeting a target performance, the data scientist may spend a bulk amount of time on the data transformation.

In some examples, the data scientist may attempt to build another machine learning pipeline by using portions of an existing machine learning pipeline (also referred to herein as a demo pipeline) having a historical performance that satisfies a target performance level. However, in some cases, differences between the data which was processed by the existing machine learning pipeline and the data to be processed by the other machine learning pipeline may render the reuse of the portions of the existing machine learning pipeline ineffective. For example, the historical performance of the existing machine learning pipeline may be tied to the data which was provided to the existing machine learning pipeline. The data transformation and model building stages is distinct for the data source in the historical pipeline.

Accordingly, for example, users (and customers) may desire to save a pipeline segment for reuse. For example, a machine learning pipeline segment is a combination of a series of data operations to complete a specific function. High-value machine learning pipeline segments are valuable data assets for a user and may serve as a valuable reference for a data scientist.

Techniques which support reduced complexity and increased flexibility associated with applying a high-value pipeline segment (e.g., that satisfies a target performance level) of an existing machine learning pipeline for creating a machine learning pipeline are desired. Other techniques for identifying and applying a pipeline segment for creating a machine learning pipeline, however, are manually implemented by a user and may be reliant on a user understanding of the existing machine learning pipeline from which the pipeline segment is identified and/or the machine learning pipeline to be created. Further, in some cases, a pipeline segment identified by the user for creating a machine learning pipeline may fail to satisfy a target performance level.

In exemplary embodiments, systems, methods, and computer program products for discovery and reuse of one or more high-value machine learning pipeline segments are provided. Example aspects of the systems, methods, and computer program products in accordance with one or more embodiments of the present disclosure are described herein.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as discovery and reuse of high-value machine learning pipeline segments as implemented at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 135), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 135 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

FIG. 2 depicts a block diagram of an example computing system 200 that supports discovery and reuse of high-value machine learning pipeline segments in accordance with one or more embodiments of the present disclosure.

All or a portion of the system 200 shown in FIG. 2 can be implemented, for example, by all or a subset of the computing environment 100 of FIG. 1. In one or more embodiments, the computing system 200 is embodied in a computer 101 as the one shown in FIG. 1. In one or more embodiments, the computing system 200 is embodied in an end user device 103 as the one shown in FIG. 1.

The computing system 200 includes system hardware 205. The system hardware 205 includes the central processing units (CPUs), graphical processing units (GPUs), memory, and the like that are part of the computing system. The system hardware 205 executes computer code stored at a memory (e.g., volatile memory 112, persistent storage 113, storage 124, and the like described with reference to FIG. 1) of the computing system 200.

The computing system 200 includes segment discovery engine 230 and a segment recommendation engine 232. The segment discovery engine 230 is capable of implementing features of discovering and saving high-value pipeline segments in accordance with one or more embodiments of the present disclosure. The segment recommendation engine 232 is capable of implementing features of reusing and recommending high-value pipeline segments for building a machine learning pipeline in accordance with one or more embodiments of the present disclosure. The terms "high-value pipeline segment" and "high-value machine learning pipeline segment" may be used interchangeably herein.

The computing system 200 includes a machine learning pipeline 215 and modeling engine 225. The machine learning pipeline 215 supports features of data transformation based on processing data provided from the data source 210. The modeling engine 225 supports features of model building based on data output by a machine learning pipeline (e.g., machine learning pipeline 215, a machine learning pipeline 245 later generated as described herein, and the like).

According to one or more embodiments of the present disclosure, the computing system 200 may identify, from a machine learning pipeline 215, one or more pipeline segments 220 (e.g., pipeline segment 220-a, pipeline segment 220-b, pipeline segment 220-n, and the like) as high value pipeline segments for reuse. In an example, each pipeline segment 220 may include a combination of a series of data operations for completing a specific function.

The computing system 200 is capable of adding or storing identified high-value machine learning pipeline segments (e.g., pipeline segment 220-b, pipeline segment 220-n) for reuse (e.g., in a database, a library, or the like). According to one or more embodiments of the present disclosure, the computing system 200 is capable of identifying candidate pipeline segments (e.g., pipeline segment 220-b, pipeline segment 220-i, pipeline segment 220-m) from among the high-value pipeline segments in association with creating a new machine learning pipeline 245 for processing a different dataset (e.g., dataset 241 associated with a data source 240). The computing system 200 is capable of recommending one or more pipeline segments (e.g., pipeline segment 220-b, pipeline segment 220-i) from among the candidate pipeline segments based on respective ranking information of the candidate pipeline segments.

Accordingly, for example, the computing system 200 supports features of automatically discovering and saving high-value pipeline segments, and further, automatically and/or semi-automatically (e.g., in combination with a user input) reusing and recommending one or more high-value pipeline segments for building a machine learning pipeline 245. In an example, for a high-value pipeline segment as described herein, the output data of the high-value pipeline segment has a significant difference by evolution degree value compared to data input to the high-value pipeline segment. The quality of output data of a high-value pipeline segment is of high quality as defined by a data quality index described herein.

The computing system 200 provides features capable of assisting a user to automatically discover high-value pipeline segments of a machine learning pipeline (e.g., machine learning pipeline 215). For example, the computing system 200 may provide functions associated with discovery and reuse of high-value pipeline segments as described herein via a UI device set 123 of a computer 101 or a user interface of a EUD 103 of FIG. 1. The computing system 200 supports saving high-value machine learning pipelines and high-value pipeline segments as data assets which may be reused in new pipeline flow. The techniques described herein may be applied in data mining/machine learning tools and data science platforms.

Example aspects of discovery of high-value machine learning pipeline segments and the reuse thereof in accordance with one or more embodiments of the present disclosure are described with reference to the following figures.

Figure 3:
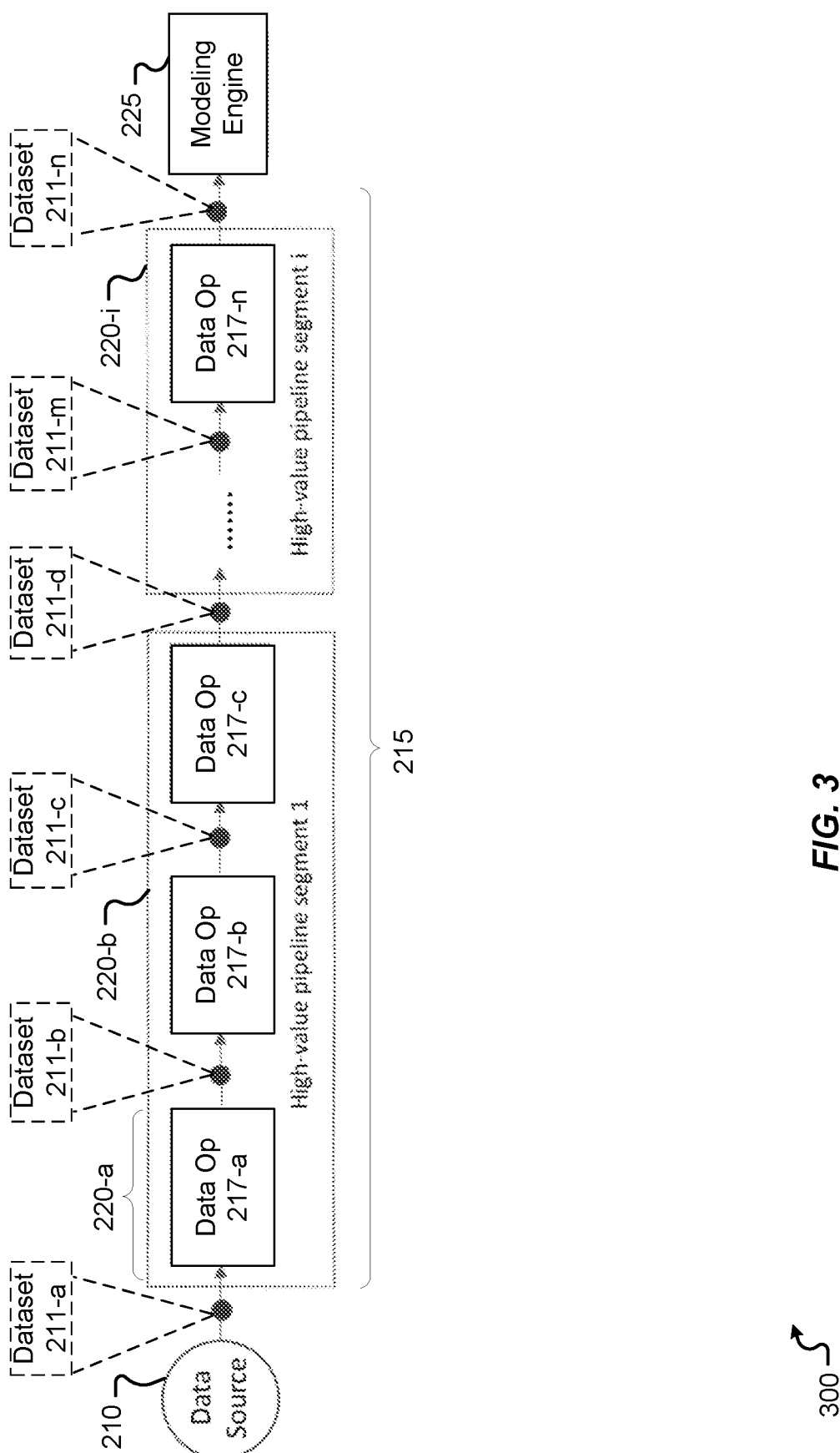
FIG. 3 illustrates an example of machine learning pipeline described in accordance with one or more embodiments of the present disclosure.

FIG. 3 illustrates an example of machine learning pipeline 215 described in accordance with one or more embodiments of the present disclosure. Example aspects of discovering a high-value pipeline segment in accordance with one or more embodiments of the present disclosure are described herein with reference to FIG. 3.

In an example, the systems and techniques described herein include identifying the machine learning pipeline 215 as a high-value pipeline based on the accuracy of a model generated (e.g., at modeling 225) using the machine learning pipeline 215. For example, the machine learning pipeline 215 is a model building pipeline, and the generated model has an accuracy which is equal to or greater than a pre-defined threshold accuracy value.

In one or more embodiments, the systems and techniques described herein include identifying the machine learning pipeline 215 as a high-value pipeline based on an indication by a user (e.g., a data scientist, a customer, and the like). For example, the machine learning pipeline 215 may be an ETL pipeline, and the machine learning pipeline 215 is marked as high quality by a user.

As will be described herein, the systems and techniques support identifying high-value pipeline segments of the machine learning pipeline 215 by evaluating characteristics of a dataset 211 input to and a dataset 211 output by each data operation 217 (or by each combination of data operations 217). In one or more embodiments, the techniques described herein may include evaluating the datasets 211 with respect to characteristics including, for example, data quality and evolution degree.

In an example, with respect to a dataset 211-*a* input to a data operation 217-*a* and a dataset 211-*b* output as a result of the data operation 217-*a*, the techniques include determining a data quality of the dataset 211-*b*. The techniques include determining an evolution degree associated with dataset 211-*a* and dataset 211-*b*. According to one or more embodiments of the present disclosure, the techniques include characterizing a pipeline segment 220-*a* associated with the data operation 217-*a* as a high-value pipeline segment if the data quality and the evolution degree are equal to or greater than respective pre-defined thresholds (also referred to herein as "target thresholds").

In another example, with respect to a dataset 211-*a* input to data operation 217-*a* and a dataset 211-*d* output by data operation 217-*c*, the techniques may include determining a data quality of the dataset 211-*d* and an evolution degree associated with dataset 211-*a* and dataset 211-*d*. According to one or more embodiments of the present disclosure, the techniques may include characterizing a pipeline segment 220-*b* associated with the data operation 217-*a* through data operation 217-*c* as a high-value pipeline segment if the data quality and the evolution degree are equal to or greater than respective pre-defined thresholds.

In one or more embodiments, the techniques described herein include discovering high-value pipeline segments from among pipeline segments 220 associated with the machine learning pipeline 215 by iteratively evaluating each data operation 217 (or groups of data operations 217) and respective datasets 211 for data quality and evolution degree as described herein until all datasets 211 (e.g., dataset 211-*a* through dataset 211-*n*) have been evaluated.

The datasets 211 are structured datasets (also referred to herein as "data records" or "data structures"). For example, the dataset 211 may be in a tabular format with rows and columns defining data attributes. As described herein, the datasets 211 may also be referred to as intermediate data. For example, dataset 211-*a* may be referred to "Intermediate Data 0", and dataset 211-*a* may be referred to as "Intermediate Data n," where n is an integer value. An example implementation of discovering high-value pipeline segments of a machine learning pipeline 215 is later described at least with reference to FIG. 5.

Figure 4:
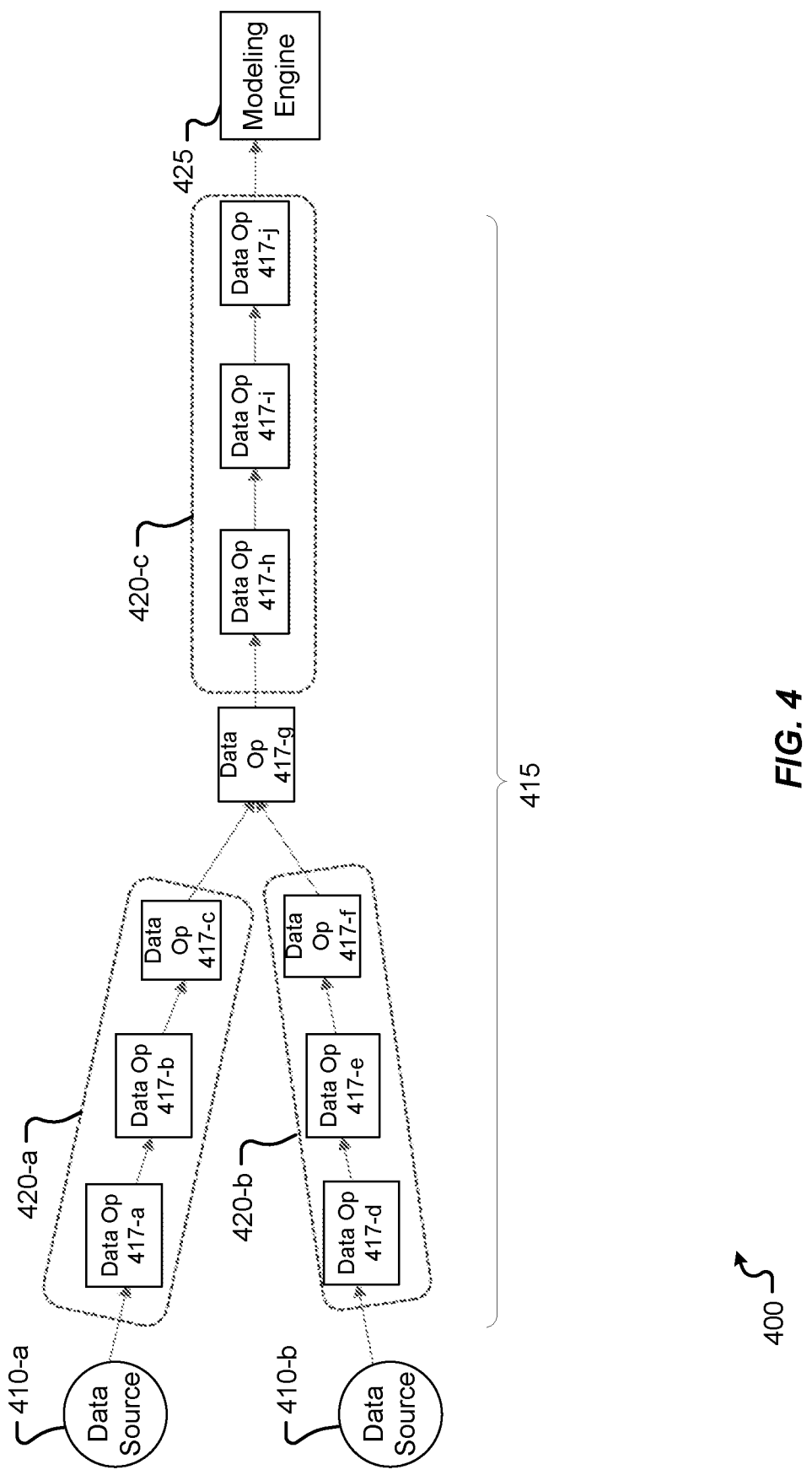
FIG. 4 illustrates an example of a machine learning pipeline described in accordance with one or more embodiments of the present disclosure.

FIG. 4 illustrates an example of a machine learning pipeline 415 described in accordance with one or more embodiments of the present disclosure. The machine learning pipeline 415 is an example of machine learning pipeline 215 described with reference to FIGS. 2 and 3. Data sources 410 are examples of data source 210 described with reference to FIGS. 2 and 3. Modeling engine 425 is an example of modeling engine 225 described with reference to FIGS. 2 and 3.

According to one or more embodiments of the present disclosure, the systems and techniques described herein support pausing the process for discovering high-value pipeline segments for cases in which a branch in the machine learning pipeline 415 is encountered. In an example, when iteratively evaluating datasets associated with data operations 417, if the computing system 200 determines that the next subsequent data operation 417 (e.g., data operation 417-*g*) is a branch node having multiple inputs, the computing system 200 may pause the discovery process. For example, the computing system 200 may remove the data operations 417 included in the pipeline segment 420-*a* from consideration in attempting to discover a high-value pipeline segment, and the computing system 200 may again initiate the process described herein for discovering a high-value pipeline segment at the next subsequent data operation 417 (e.g., data operation 417-*h*). Additionally, or alternatively, if the computing system 200 determines that a data operation 417 is a branch node having multiple outputs, the computing system 200 may pause the discovery process.

Accordingly, for example, the techniques described herein include pausing or stopping the discovery process when meeting a node (e.g., associated with a data operation 417) which has multiple inputs or outputs, and then unpausing or reinitiating the discovery process beginning at the next node which has no more than one input and one output.

FIGS. 5 through 11 illustrate example flowcharts in accordance with one or more embodiments of the present disclosure. The methods of the example flowcharts may be implemented by any suitable portion of the computing environment 100 and computing system 200 described with reference to FIGS. 1 and 2.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts. Certain operations described as being performed in the order shown may be performed in parallel or partially in parallel.

Figure 5:
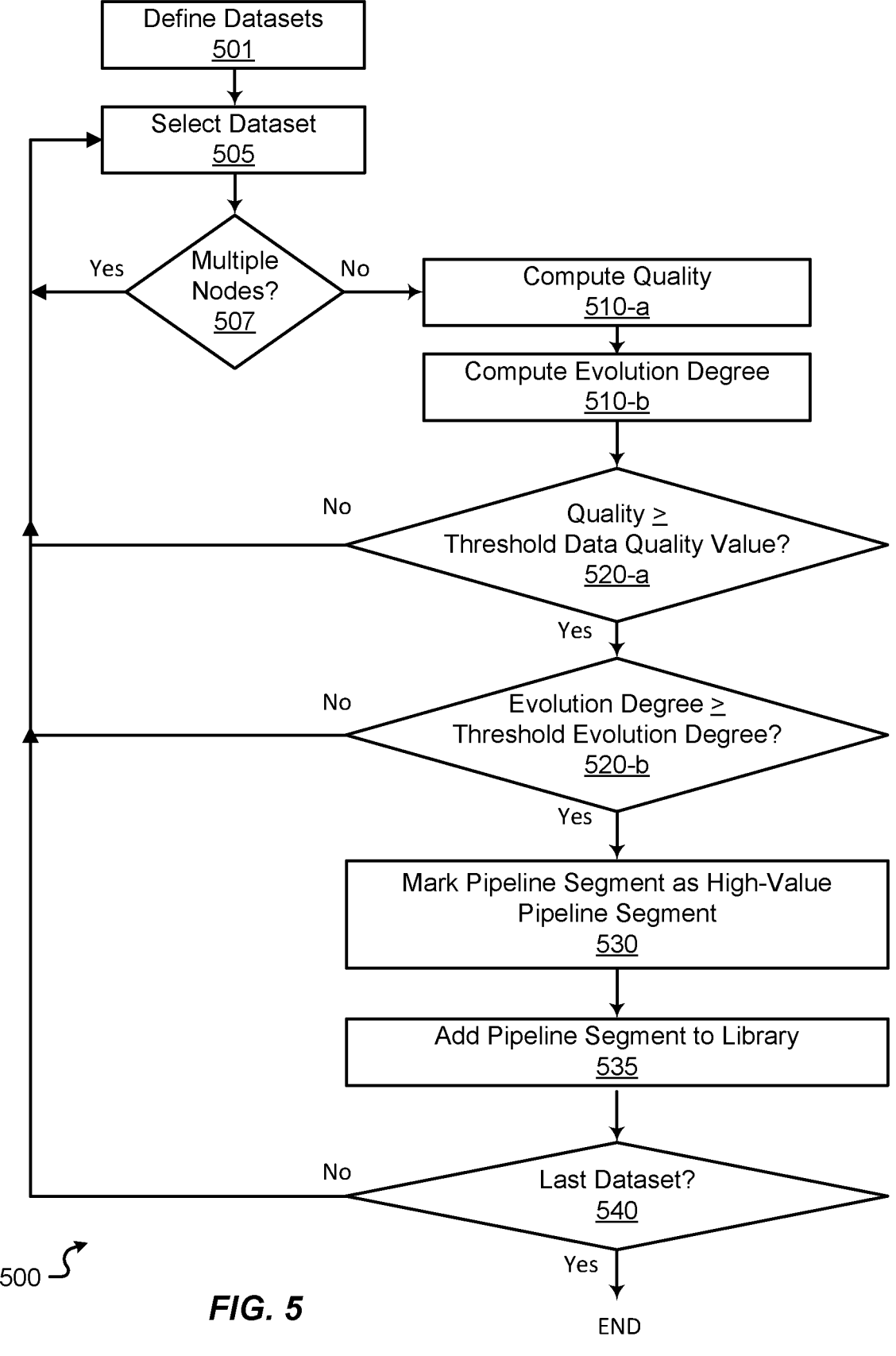
FIG. 5 illustrates an example flowchart that supports discovery of a high value pipeline segment in accordance with one or more embodiments of the present disclosure.

FIG. 5 illustrates an example flowchart of a method 500 that supports discovery of a high value pipeline segment in accordance with one or more embodiments of the present disclosure. Example aspects of the method 500 are described with reference to FIGS. 3 and 4.

At 501, the method 500 includes defining datasets 211 (e.g., defining intermediate data) associated with various data operations 217 of the machine learning pipeline 215. In an example, of defining datasets 211, the method 500 includes fetching datasets 211 (intermediate data) by caching or persisting the output data of data operations 217 to a storage device described herein.

At 505, the method 500 includes selecting a dataset 211 from the defined datasets 211. In an example, the method 500 may start at a dataset 211 subsequent to a first dataset 211 (e.g., dataset 211-*a*) of the defined datasets 211. For example, the method 500 may start at dataset 211-*b*.

At 507, the method 500 determines whether the dataset 211 (e.g., dataset 211-*b*) is associated with a branch node having multiple inputs or outputs. In an example, in response to determining the dataset 211 is not associated with a branch node, the method 500 proceeds to 510-*a*. In another example, in response to determining the dataset 211 is associated with a branch node, the method 500 returns to 505.

At 510-*a*, the method 500 includes computing the quality of the dataset 211-*b*. Example aspects of computing the data quality in accordance with one or more embodiments of the present disclosure are later described herein.

At 510-*b*, the method 500 includes computing the evolution degree of the dataset 211-*b*. In an example, computing the evolution degree may include comparing the dataset 211-*b* with the dataset 211-*a*. Example aspects of computing the evolution degree in accordance with one or more embodiments of the present disclosure are later described herein.

At 520-*a*, the method 500 includes comparing the data quality of the dataset 211-*b* to a threshold data quality value.

In an example, in response to determining the data quality of the dataset 211-*b* is equal to or greater than the threshold data quality value, the method 500 proceeds to 520-*b*.

In another example, in response to determining the data quality of the dataset 211-*b* is less than the threshold data quality value, the method 500 may return to 505. Returning to 505, for example, the method 500 may include selecting the next subsequent dataset 211 (e.g., dataset 211-*c*) of the machine learning pipeline 215.

At 520-*b*, the method 500 includes comparing the evolution degree of the dataset 211-*b* to a threshold evolution degree value. In an example, in response to determining the evolution degree of the dataset 211-*b* is equal to or greater than the threshold evolution degree value, the method 500 proceeds to 530.

In another example, in response to determining the evolution degree of the dataset 211-*b* is less than the threshold evolution degree value, the method 500 may return to 505. Returning to 505, for example, the method 500 may include selecting the next subsequent dataset 211 (e.g., dataset 211-*c*) of the machine learning pipeline 215.

In one or more embodiments, the method 500 proceeds to 530 if both criteria (e.g., data quality and evolution degree) are satisfied, but aspects of the present disclosure are not limited thereto. For example, in some other embodiments, the method 500 may proceed to 530 if at least one of the criteria (e.g., data quality and/or evolution degree) is satisfied.

In an example, at 530, the method 500 includes marking the pipeline segment 220-*b* as a high-value pipeline segment for reuse in association with the creation of a new machine learning pipeline (e.g., machine learning pipeline 245, another machine learning pipeline, or the like).

At 535, the method 500 includes adding the pipeline segment 220-*b* to a library of high-value pipeline segments. In an example, at 530, the method 500 includes storing data corresponding to the pipeline segment 220-*b* to the library (or a database). In an example, after marking the pipeline segment 220 for reuse (at 530) and/or storing the corresponding data (at 535), the method 500 may return to 505. Non-limiting examples of the data stored at 535 are described herein. In some aspects, at 535, the method 500 includes generating a list or table for referencing the high-value pipeline segments.

In an example, together with the pipeline segment 220-*b* marked as high-value pipeline segment, the method 500 includes storing (at 535) metadata of the input data and output data corresponding to the pipeline segment 220-*b*. For example, with reference to pipeline segment 220-*b*, the method 500 includes storing (at 535) metadata of dataset 211-*a* (e.g., metadata of input data) and metadata of the dataset 211-*d* (e.g., metadata of output data). The terms "metadata" and "metadata information" may be used interchangeably herein.

In another example, together with the pipeline segment 220-*b* identified as a high-value pipeline segment, the method 500 includes storing (at 535) other information together with the stream. For example, the method 500 includes storing position information of the pipeline segment 220-*b* in the machine learning pipeline 215. In another example, the method 500 includes storing a model building operation (also referred to herein as a "final modeling algorithm") of the data flow associated with the pipeline segment 220-*b*.

In some other examples, the method 500 includes storing (at 535) descriptive data about the pipeline segment 220-*b* identified as a high-value pipeline segment. For example, the descriptive data may include a text-based description (e.g., keywords) corresponding to the pipeline segment 220-*b*. In one or more embodiments, the method 500 may include generating the descriptive data from the operator's information in the pipeline segment pipeline segment 220-*b* using a natural language processing (NLP) algorithm implemented by a large language model (LLM) of the computing system 200.

At 540, the method 500 includes determining whether the dataset 211-*b* is the last dataset among the datasets 211 defined at 501. In an example, in response to determining the dataset 211-*b* is the last dataset, the method 500 may end. In another example, in response to determining the dataset 211-*b* is not the last dataset 211 (e.g., other datasets 211 defined at 501 have not been evaluated for data quality and evolution degree), the method 500 returns to 505.

In an example, with reference to FIGS. 2 and 3, the method 500 determines pipeline segment 220-*a* as not being a high-value pipeline segment, but determines pipeline segment 220-*b* and pipeline segment 220-*i* as high-value pipeline segments for reuse.

As described herein, the techniques according to one or more embodiments of the present disclosure include performing the operations of the method 500 with respect to the machine learning pipeline 215, from upstreaming to downstreaming, node by node, until all datasets 211 are identified which satisfy the criteria of: data quality of the dataset 211 is equal to or greater than a pre-defined threshold data quality value and evolution degree of the dataset 211 is equal to or greater than a pre-defined threshold evolution degree value.

As described herein, the techniques support marking a pipeline segment 220 from a dataset 211 to another dataset 211 (e.g., from intermediate data 1 to intermediate data i) as a high-value pipeline segment and saving the pipeline segment 220 for reuse. The techniques include, starting from a subsequent dataset 211 (e.g., intermediate data i+1), iteratively performing 510 through 540 to identify and save high-value pipeline segments until dataset 211-*n* (e.g., intermediate data n). As described herein, the techniques support discovery of all high-value pipeline segments from the machine learning pipeline 215.

In an example case, referring to the machine learning pipeline 215 of FIG. 3, the method 500 may determine that pipeline segment 220-*a* is not a high-value pipeline segment (e.g., due to data quality and/or evolution degree of dataset 211-*b*). The method 500 proceeds to evaluate subsequent datasets 211 and determines that the data quality of dataset 211-*d* is equal to or greater than the threshold data quality value, and further, that the evolution degree of dataset 211-*d* (e.g., compared to dataset 211-*a*) is equal to or greater than the threshold evolution degree value. The method 500 includes marking the pipeline segment 220-*b* as a high-value pipeline segment for reuse and storing corresponding data as described herein.

The method 500 proceeds to iteratively evaluate subsequent datasets 211 (e.g., following dataset 211-*d*) and determines that the data quality of dataset 211-*n* is equal to or greater than the threshold data quality value, and further, that the evolution degree of dataset 211-*n* (e.g., compared to dataset 211-*d*) is equal to or greater than the threshold evolution degree value. The method 500 includes saving pipeline segment 220-*i* as a high-value pipeline segment as described herein. In an example, dataset 211-*n* is the final output of the machine learning pipeline 215, and the method 500 concludes after evaluating dataset 211-*n*.

Referring to the example of FIG. 2, example high-value pipeline segments identified from the machine learning pipeline 215 according to the techniques described herein include pipeline segment 220-b, pipeline segment 220-c, pipeline segment 220-d, pipeline segment 220-f, pipeline segment 220-i, and pipeline segment 220-m.

Example aspects of determining and defining data quality in accordance with one or more embodiments of the present disclosure are described herein. In some aspects, the techniques include using statistics to describe data quality.

Each column of the data has a quality index, which can be evaluated by one univariate statistics or composed by multiple univariate statistics. Non-limiting examples of the univariate statistics include missing value proportion, skewness, Kurtosis, and the like. Standardize the index value in a range of (0, 1), in which an index value corresponds to a data quality. For example, a higher index value (e.g., above a threshold index value) corresponds to a higher data quality. Compose each column quality index as the data quality by Equation (1).

$$Quality_{data} = \frac{1}{n}\sum\nolimits_{i=0}^{n} ColumnQuality_i \qquad (1)$$

Example aspects of determining the quality index may account for the proportion of missing values (e.g., records not collected). In an example of statistics for determining the quality of a column (ColumnQuality), total record count is p, and missing value count is q. The quality index for the column is defined by Equation (2).

$$ColumnQuality = \frac{p - q}{p} \qquad (2)$$

In an example of n columns, the data quality is defined by Equation (3).

$$DataQality = \frac{1}{n}\sum\nolimits_{i=0}^{n} \frac{p - q_i}{p} \qquad (3)$$

Example aspects of determining evolution degree in accordance with one or more embodiments of the present disclosure are described herein. In some aspects, the techniques include using statistics to describe evolution degree.

The evolution degree of two datasets from the same data source can be accumulated by the following statistics: the update rate of fields (regarding field count), the update rate of records (regarding record count), and the update rate regarding the same field (can be identified by the column name).

In an example, for continuous field, the update rate is computed regarding: mean, standard error, variance, skew, and kurtosis. In an example, for categorical field, the update rate is computed regarding: number of categories and number of records in each category.

The update rate is defined by Equation (4), and the update rate (for each item) may have a value ranging from 0 to 1.

$$UpdateRate = \left| \frac{Stat_{new} - Stat_{old}}{Stat_{old}} \right| \qquad (4)$$

In one or more embodiments, determining evolution degree may include adding a respective weight to each update rate (e.g., according to business requirement). In an example, the number of statistics is n, and each of the statistics will have an update rate. Determining evolution degree may include applying a pre-defined weight (e.g., ranging from 0 to 1) to each, as illustrated in Equation (5).

For example, the update rate of fields has a weight of $Weight_1$, the update rate of records has a weight of $Weight_2$, the update rate regarding the same field has a weight of $Weight_3$. In an example, for a continuous field, compute the update rate regarding mean (having a weight of $Weight_4$) and standard error (having a weight of $Weight_5$).

$$EvolutionDegree = \sum\nolimits_{i=1}^{n} UpdateRate_i * Weight_i \qquad (5)$$

According to example aspects of the present disclosure, a larger evolution degree value associated with compared data equates to a larger difference between the compared data. A smaller evolution degree value associated with compared data equates to a smaller difference between the compared data (e.g., an increased similarity between the compared data).

According to one or more embodiments of the present disclosure as described herein, the techniques described herein provide an intelligent method to automatically discover the high-value pipeline segments for further reuse. The techniques include defining the statistics to describe the data quality of a structured datasets and defining the statistics to describe the evolution degree of two structured datasets from the same data source. The techniques include selecting a machine learning pipeline (e.g., a high-value machine learning pipeline) from the data source, and collecting and computing the defined statistics (e.g., describing data quality and evolution degree) for each intermediate data.

In one or more embodiments, from the data source, the techniques include comparing the evolution degree of adjacent intermediate data in the pipeline iteratively. The techniques include, if there is a significant difference (e.g., based on evolution degree) between the adjacent intermediate data and a data quality criterion is met as described herein, extracting the associated processing pipeline (e.g., sub-pipeline of the machine learning pipeline) as a high-value pipeline segment. Then performing the comparison techniques at the next subsequent node of the machine learning pipeline, until all high-value pipeline segments are found. The techniques include saving the high-value pipeline segments for reuse, for example, in association with recommending one or more of the high-value pipeline segments for creating a new pipeline.

The techniques described herein provide advantages of a process of discovering high-value pipeline segments for reuse from a machine learning pipeline, which is lacking in other pipeline analysis techniques.

FIG. 6 illustrates an example flowchart of a method 600 that supports high-value pipeline segment recommendation in association with generating a machine learning pipeline in accordance with one or more embodiments of the present disclosure. Example aspects of the method 600 are described with reference to FIGS. 2 and 3.

At 605, the method 600 includes detecting the similarity between current data and the input data of high-value pipeline segments. In some aspects, the similarity computation can leverage the algorithm of statistics to describe evolution degree.

In an example, the method 600 includes detecting the similarity between a dataset 241 for processing by a machine learning pipeline to be generated (e.g., a machine learning pipeline 245) and the input data of pipeline segments 220 that are marked as high-value pipeline segments. For example, at 605, the method 600 includes detecting the similarity between dataset 241 and datasets 211 which were respectively input to pipeline segment 220-*b*, pipeline segment 220-*c*, pipeline segment 220-*d*, pipeline segment 220-*f*, pipeline segment 220-*i*, and pipeline segment 220-*m*. For example, referencing back to FIG. 3, the dataset 211-*a* is the input data corresponding to the pipeline segment 220-*b*, and the dataset 211-*d* is the input data corresponding to the pipeline segment 220-*i*.

For example, at 607, the method 600 includes selecting a high-value pipeline segment from among the high-value pipeline segments identified from machine learning pipeline 215. In an example, at 607, the method 600 includes selecting pipeline segment 220-*b*, which was identified as a high-value pipeline segment. In one or more embodiments, the selection may be based on any suitable criteria (e.g., data quality of data output by the high-value pipeline segment, evolution degree of data output by the high-value pipeline segment, a sequential ordering within the machine learning pipeline 215, and the like).

At 610, the method 600 includes calculating a similarity value between the dataset 241 and the dataset 211 (e.g., dataset 211-*a*) corresponding to the selected high-value pipeline segment (e.g., pipeline segment 220-*b*).

In one or more embodiments, calculating the similarity value may include computing the statistics of evolution degree between the dataset 241 and the dataset 211 (e.g., dataset 211-*a*), as the similarity value. For example, calculating the similarity value may include the techniques described herein in association with calculating an evolution degree of two datasets. In some aspects, the similarity value may be referred to herein as a statistics value. The similarity value may include evolution degree as described herein.

At 615, the method 600 includes comparing the similarity value to a threshold similarity value for the selected high-value pipeline segment (e.g., pipeline segment 220-*b*). In one or more embodiments, the threshold similarity value may be a pre-defined threshold similarity value. The threshold similarity value may be, for example, a threshold evolution degree value.

If the similarity value is equal to or greater than the threshold similarity value, the method 600 concludes the current dataset 241 and the dataset 211 (e.g., dataset 211-*a*) corresponding to the selected high-value pipeline segment (e.g., pipeline segment 220-*b*) are similar and proceeds to 620. In one or more embodiments, the method 600 includes using the inverse value of the evolution degree as the similarity value.

At 620, the method 600 includes selecting the high-value pipeline segment (e.g., pipeline segment 220-*b*) as a candidate high-value pipeline segment for creating machine learning pipeline 245. In some aspects, at 615, the method 600 includes adding the high-value pipeline segment to candidate high-value pipeline segments for creating the machine learning pipeline 245.

Alternatively, at 615, if the similarity value is less than the threshold similarity value, the method 600 concludes the current dataset 241 and the dataset 211 (e.g., dataset 211-*a*) corresponding to the selected high-value pipeline segment (e.g., pipeline segment 220-*b*) are not similar and returns to 607. Expressed another way, if the statistics value is greater than the pre-defined threshold (e.g., the evolution degree is greater than the pre-defined threshold), the method 600 concludes the current dataset 241 and the dataset 211 (e.g., dataset 211-*a*) are not similar, and the high-value pipeline segment (e.g., pipeline segment 220-*b*) is not selected as a candidate high-value pipeline segment for creating machine learning pipeline 245.

Returning to 607, the method 600 includes selecting another high-value pipeline segment (e.g., pipeline segment 220-*c*) from among the high-value pipeline segments. The method 600 may include repeating the operations described with reference to 607 through 620 until all high-value pipeline segments have been evaluated. Accordingly, for example, the method 600 may include evaluating each high-value pipeline segment in association with determining candidate high-value pipeline segments (also referred to herein as candidate pipeline segments) for the machine learning pipeline 245 until all high-value pipeline segments have been evaluated.

With reference to the example of FIG. 2, the method 600 selects pipeline segment 220-*b*, pipeline segment 220-*i*, and pipeline segment 220-*m* as candidate pipeline segments.

At 625, the method 600 includes ranking the candidate pipeline segments based on respective similarity values (e.g., as calculated at 610). Accordingly, for example, the techniques described herein include ranking all candidate pipeline segments (e.g., found high value pipeline segments) according to respective similarity values. In an example, at 625, the method 600 includes generating ranking information respective to the candidate pipeline segments based on the respective similarity values.

At 630, the method 600 may include generating a list of recommended pipeline segments (recommended high-value pipeline segments). For example, at 630, the method 600 includes selecting one or more of the candidate pipeline segments based on the respective rankings.

In an example, at 630, the method 600 may include selecting a quantity (e.g., the two highest-ranked candidate pipeline segments, three highest-ranked candidate pipeline segments, or the like) of pipeline segments 220 from among the candidate pipeline segments based on one or more criteria suitable for creating the machine learning pipeline 245 and providing (e.g., at 635) corresponding recommendation information.

In an example of generating the list of recommended pipeline segments, the method 600 may include selecting pipeline segments 220 (e.g., pipeline segment 220-*b*, pipeline segment 220-*i*) from among the candidate pipeline segments based on level of similarity and usefulness (e.g., with respect to building machine learning pipeline 245 and processing current dataset 241).

At 635, the method 600 includes providing recommendation information including the list of recommended pipeline segments. In an example, the method 600 includes providing the recommendation information via device set 123, EUD 103, or the like. In one or more embodiments, the recommendation information includes additional information regarding the recommended pipeline segments which a user may reference.

In one or more embodiments, for a recommended pipeline segment (e.g., pipeline segment 220-*b*, pipeline segment 220-*i*, or the like), the additional information includes the metadata of the output of the recommended pipeline segment. With reference to FIG. 3, in an example in which pipeline segment 220-*b* is a recommended pipeline segment, the additional information may include the metadata of dataset 211-*d* output by pipeline segment 220-*b*.

In one or more embodiments, for a recommended pipeline segment, the additional information includes the model building algorithm used in the lower stream of the recommended pipeline segment. In an example in which pipeline segment 220-*b* is a recommended pipeline segment, the additional information may include the model building algorithm used in the lower stream of pipeline segment 220-*b*. In an example case in which the machine learning pipeline 215 is a modeling building pipeline, the lower stream means the end modeling node point of the stream (e.g., at modeling engine 225 of FIG. 3).

At 640, the method 600 includes building the machine learning pipeline 245 using one or more of the recommended pipeline segments.

The systems and techniques described herein in accordance with one or more embodiments of the present disclosure support the reuse of high-value pipeline segments. The systems and techniques include grouping all the high-value pipeline segments into a pool of candidate pipeline segments (candidate high-value pipeline segments) for reuse in building a machine learning pipeline.

In an example implementation, when a user reruns an existing pipeline flow (in which the high-value pipeline segments have already been identified) against new data, the systems and techniques described herein support caching the intermediate data after each high-value pipeline segment of the existing pipeline flow. For example, with reference to FIG. 3, the pipeline segment 220-*b* is a high-value pipeline segment, and the systems and techniques support caching dataset 211-*d*. In some aspects, caching the intermediate data provides a technical improvement through a type of improved fault-tolerant mechanism for cases in which a problem arises during the execution of the existing pipeline flow.

In another example implementation, when a user creates a new pipeline flow, the systems and techniques described herein support automatically detecting the similarity between current data (e.g., dataset 241) for the new pipeline flow and the input data of high-value pipeline segments (e.g., dataset 211-*a* input to pipeline segment 220-*b*, dataset 211-*d* input to pipeline segment 220-*i*, and the like) and determining recommended high-value pipeline segments based on similarity values described herein.

FIG. 7 illustrates an example flowchart of a method 700 that supports discovery of a high value pipeline segment in accordance with one or more embodiments of the present disclosure.

At 705, the method 700 includes defining a set of datasets associated with a processing pipeline based on a set of data operations of the processing pipeline.

At 710, the method 700 includes generating a library of pipeline segments based on the processing pipeline and at least one dataset of the set of datasets. In some aspects, generating the library of pipeline segments includes adding a pipeline segment of the processing pipeline to the library based on one or more characteristics of a dataset generated by the pipeline segment, where the dataset is included in the set of datasets.

Figure 8:
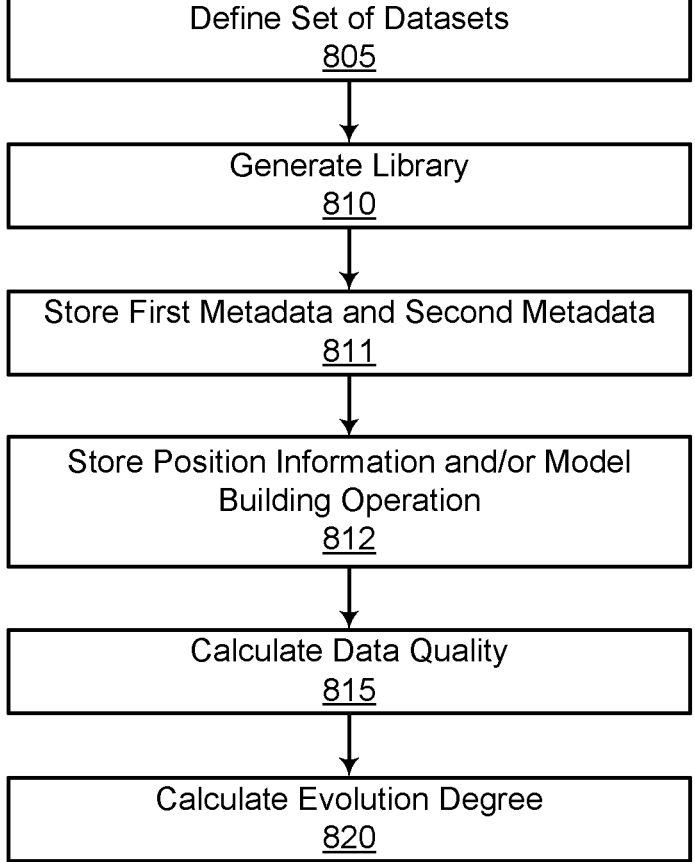

FIG. 8 illustrates an example flowchart of a method 800 that supports discovery of a high value pipeline segment in accordance with one or more embodiments of the present disclosure.

At 805, the method 800 includes defining a set of datasets associated with a processing pipeline based on a set of data operations of the processing pipeline.

In one or more embodiments, the processing pipeline includes one of: a machine learning pipeline; and a model building pipeline.

At 810, the method 800 includes generating a library of pipeline segments based on the processing pipeline and at least one dataset of the set of datasets. In some aspects, generating the library of pipeline segments includes adding a pipeline segment of the processing pipeline to the library based on one or more characteristics of a dataset generated by the pipeline segment, where the dataset is included in the set of datasets.

At 811, the method 800 includes storing, to the library of pipeline segments: first metadata associated with the dataset generated by the pipeline segment; and second metadata associated with an input dataset associated with the pipeline segment.

At 812, the method 800 includes storing, to the library of pipeline segments, at least one of: position information of the pipeline segment with respect to the processing pipeline; and a model building operation associated with at least a portion of the pipeline segment.

At 815, the method 800 includes calculating a data quality of the dataset based on a quality index associated with one or more columns of data included in the dataset, where adding the pipeline segment to the library is based on comparing the data quality to a threshold data quality value.

At 820, the method 800 includes calculating an evolution degree associated with the dataset based on a comparison of the dataset and an input dataset associated with the pipeline segment, where adding the pipeline segment to the library is based on comparing the evolution degree to a threshold evolution degree value.

In one or more embodiments, at 820, the method 800 includes calculating the evolution degree associated with the dataset based on an update rate, where the update rate is associated with data included in the dataset and second data included in an input dataset associated with the pipeline segment, and where the one or more characteristics of the dataset include the evolution degree.

In one or more embodiments, the method 800 includes refraining from evaluating a dataset based on at least one of: determining the dataset is an input dataset associated with at least a first data operation and a second data operation of the processing pipeline; and determining the dataset is an output dataset associated with at least a third data operation and a fourth data operation of the processing pipeline.

FIG. 9 illustrates an example flowchart of a method 900 that supports discovery and reuse of high-value pipeline segment in accordance with one or more embodiments of the present disclosure.

At 905, the method 900 includes defining a set of datasets associated with a processing pipeline based on a set of data operations of the processing pipeline.

At 910, the method 900 includes generating a library of pipeline segments based on the processing pipeline and at least one dataset of the set of datasets. In some aspects, generating the library of pipeline segments includes adding a pipeline segment of the processing pipeline to the library based on one or more characteristics of a dataset generated by the pipeline segment, where the dataset is included in the set of datasets.

At 925, the method 900 includes processing, by the processing pipeline, a second dataset different from the set of datasets, where processing the second dataset includes caching output data associated with the pipeline segment.

FIG. 10 illustrates an example flowchart of a method 1000 that supports high-value pipeline segment recommendation in association with generating a machine learning pipeline in accordance with one or more embodiments of the present disclosure.

At 1005, the method 1000 includes determining at least one candidate pipeline segment from among a set of pipeline segments in association with generating a processing pipeline, where determining the at least one candidate pipeline segment is based on a similarity value between a dataset to be processed by the processing pipeline and an input dataset associated with the at least one candidate pipeline segment.

At 1010, the method 1000 includes generating ranking information associated with the at least one candidate pipeline segment based on the similarity value.

At 1015, the method 1000 includes generating the processing pipeline using the at least one candidate pipeline segment or at least one other candidate pipeline segment, based on the ranking information of the at least one candidate pipeline segment.

FIG. 11 illustrates an example flowchart of a method 1100 that supports high-value pipeline segment recommendation in association with generating a machine learning pipeline in accordance with one or more embodiments of the present disclosure.

At 1105, the method 1100 includes determining at least one candidate pipeline segment from among a set of pipeline segments in association with generating a processing pipeline, where determining the at least one candidate pipeline segment is based on a similarity value between a dataset to be processed by the processing pipeline and an input dataset associated with the at least one candidate pipeline segment.

In one or more embodiments, the method 1100 includes calculating the similarity value based on an evolution degree associated with the dataset and the input dataset.

At 1110, the method 1100 includes generating ranking information associated with the at least one candidate pipeline segment based on the similarity value.

At 1111, the method 1100 includes adding the at least one candidate pipeline segment to a set of recommended pipeline segments based on the ranking information associated with the at least one candidate pipeline segment, where the set of recommended pipeline segments further includes the at least one other candidate pipeline segment.

At 1112, the method 1100 includes providing a recommendation associated with using the at least one candidate pipeline segment for generating the processing pipeline, where the recommendation includes at least one of: metadata of an output dataset associated with the at least one candidate pipeline segment; and a model building operation associated with at least a portion of the at least one candidate pipeline segment.

At 1115, the method 1100 includes generating the processing pipeline using the at least one candidate pipeline segment or at least one other candidate pipeline segment, based on the ranking information of the at least one candidate pipeline segment.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
defining a set of datasets associated with a processing pipeline based on a set of data operations of the processing pipeline; and
generating a library of pipeline segments based on the processing pipeline and at least one dataset of the set of datasets,
wherein generating the library of pipeline segments comprises adding a pipeline segment of the processing pipeline to the library based on:
calculating a data quality of a dataset generated by the pipeline segment, based on a quality index associated with one or more columns of data comprised in the dataset;
comparing the data quality of the dataset generated by the pipeline segment to a threshold data quality value; and
comparing an evolution degree associated with the dataset to a threshold evolution degree value,
wherein the dataset is included in the set of datasets.

2. The computer-implemented method of claim 1, further comprising:
calculating the evolution degree associated with the dataset based on a comparison of the dataset and an input dataset associated with the pipeline segment.

3. The computer-implemented method of claim 1, further comprising:
calculating the evolution degree associated with the dataset based on an update rate, wherein the update rate is associated with data comprised in the dataset and second data comprised in an input dataset associated with the pipeline segment.

4. The computer-implemented method of claim 1, further comprising:
refraining from evaluating the dataset based on at least one of:
determining the dataset is an input dataset associated with at least a first data operation and a second data operation of the processing pipeline; and
determining the dataset is an output dataset associated with at least a third data operation and a fourth data operation of the processing pipeline.

5. The computer-implemented method of claim 1, further comprising storing, to the library of pipeline segments:
first metadata associated with the dataset generated by the pipeline segment; and
second metadata associated with an input dataset associated with the pipeline segment.

6. The computer-implemented method of claim 1, further comprising storing, to the library of pipeline segments, at least one of:
position information of the pipeline segment with respect to the processing pipeline; and
a model building operation associated with at least a portion of the pipeline segment.

7. The computer-implemented method of claim 1, wherein the processing pipeline comprises one of:
a machine learning pipeline; and
a model building pipeline.

8. The computer-implemented method of claim 1, further comprising:
processing, by the processing pipeline, a second dataset different from the set of datasets, wherein processing the second dataset comprises caching output data associated with the pipeline segment.

9. A computer-implemented method comprising:
determining at least one candidate pipeline segment from among a set of pipeline segments in association with generating a processing pipeline,
wherein determining the at least one candidate pipeline segment:
comprises calculating a data quality of an output dataset generated by the at least one candidate pipeline segment, based on a quality index associated with one or more columns of data comprised in the output dataset;
comprises calculating a similarity value between a dataset to be processed by the processing pipeline and an input dataset associated with the at least one candidate pipeline segment, based on an evolution degree associated with the dataset and the input dataset; and
is based on:
the data quality of the output dataset generated by the at least one candidate pipeline segment; and
the similarity value between the dataset to be processed by the processing pipeline and the input dataset associated with the at least one candidate pipeline segment;
generating ranking information associated with the at least one candidate pipeline segment based on the similarity value; and
generating the processing pipeline using the at least one candidate pipeline segment or at least one other candidate pipeline segment, based at least in part on the ranking information of the at least one candidate pipeline segment.

10. The computer-implemented method of claim 9, further comprising:

providing a recommendation associated with using the at least one candidate pipeline segment for generating the processing pipeline, wherein the recommendation comprises at least one of:

metadata of an output dataset associated with the at least one candidate pipeline segment; and a model building operation associated with at least a portion of the at least one candidate pipeline segment.

11. The computer-implemented method of claim 9, further comprising:

adding the at least one candidate pipeline segment to a set of recommended pipeline segments based on the ranking information associated with the at least one candidate pipeline segment, wherein the set of recommended pipeline segments further comprises the at least one other candidate pipeline segment.

12. A computing system having a memory having computer readable instructions and one or more processors for executing the computer readable instructions, the computer readable instructions controlling the one or more processors to perform operations comprising:

defining a set of datasets associated with a processing pipeline based on a set of data operations of the processing pipeline; and generating a library of pipeline segments based on the processing pipeline and at least one dataset of the set of datasets, wherein generating the library of pipeline segments comprises adding a pipeline segment of the processing pipeline to the library based on:

calculating a data quality of a dataset generated by the pipeline segment, based on a quality index associated with one or more columns of data comprised in the dataset;

comparing the data quality of the dataset generated by the pipeline segment to a threshold data quality value; and comparing an evolution degree associated with the dataset to a threshold evolution degree value, wherein the dataset is included in the set of datasets.

13. The computing system of claim 12, wherein the computer readable instructions control the one or more processors to further perform operations comprising:

calculating the evolution degree associated with the dataset based on a comparison of the dataset and an input dataset associated with the pipeline segment.

14. The computing system of claim 12, wherein the computer readable instructions control the one or more processors to further perform operations comprising:

calculating the evolution degree associated with the dataset based on an update rate, wherein the update rate is associated with data comprised in the dataset and second data comprised in an input dataset associated with the pipeline segment.

15. The computing system of claim 12, wherein the computer readable instructions control the one or more processors to further perform operations comprising:

refraining from evaluating the dataset based on at least one of:

determining the dataset is an input dataset associated with at least a first data operation and a second data operation of the processing pipeline; and determining the dataset is an output dataset associated with at least a third data operation and a fourth data operation of the processing pipeline.

16. The computing system of claim 12, wherein the computer readable instructions control the one or more processors to further perform operations comprising:

storing, to the library of pipeline segments:

first metadata associated with the dataset generated by the pipeline segment; and second metadata associated with an input dataset associated with the pipeline segment.

17. The computing system of claim 12, wherein the computer readable instructions control the one or more processors to further perform operations comprising:

storing, to the library of pipeline segments, at least one of:

position information of the pipeline segment with respect to the processing pipeline; and a model building operation associated with at least a portion of the pipeline segment.

* * * * *